United States Patent [19]
Taguchi

[11] Patent Number: 5,123,298
[45] Date of Patent: Jun. 23, 1992

[54] AUTOMATIC TRANSAXLE CASE WITH WEB REINFORCED GOVERNOR

[75] Inventor: Hiromi Taguchi, Zama, Japan

[73] Assignee: Nissan Motor Co., Ltd., Yokohama, Japan

[21] Appl. No.: 413,568

[22] Filed: Sep. 28, 1989

[30] Foreign Application Priority Data

Oct. 7, 1988 [JP] Japan .................. 63-252158

[51] Int. Cl.$^5$ .................................... F16H 57/02
[52] U.S. Cl. ................................................ 74/606 R
[58] Field of Search ........................... 74/606 R, 609

[56] References Cited

U.S. PATENT DOCUMENTS

| | | | |
|---|---|---|---|
| 4,823,637 | 4/1989 | Taguchi et al. | 74/606 R |
| 4,901,605 | 2/1990 | Taguchi | 74/606 R |
| 4,989,475 | 2/1991 | Furuya et al. | 74/606 R |

FOREIGN PATENT DOCUMENTS

| | | | |
|---|---|---|---|
| 323339 | 7/1989 | European Pat. Off. | 74/606 R |
| 137765 | 8/1982 | Japan | 74/606 R |
| 41076 | 2/1986 | Japan | 74/606 R |

Primary Examiner—Rodney H. Bonck
Assistant Examiner—Khoi Q. Ta
Attorney, Agent, or Firm—Foley & Lardner

[57] ABSTRACT

In a transmission case section for an automatic transaxle case, a center axis of a governor receiving portion is arranged between a center axis of a main power train and a center axis of a reduction gear when viewed in plane perpendicular to the center axis of the main power train and the center axis of the final drive gear. A nearly right-angled triangular reinforcement is formed in a corner between a main power train receiving portion and differential side cover portion. The governor receiving portion is formed so as to extend through the reinforcement.

7 Claims, 7 Drawing Sheets

AUTOMATIC TRANSAXLE CASE WITH WEB REINFORCED GOVERNOR

BACKGROUND OF THE INVENTION

1. Field of the Invention

The present invention relates to an automatic transaxle for a front engine-front drive vehicle and more particularly to a casing for such an automatic transaxle.

2. Description of the Prior Art

An example of a prior art automatic transaxle is discribed in "Service Manual for Toyota A140 Automatic Transmission", published in May, 1985 by Toyota Motor Co., Ltd. and also shown in FIGS. 6 and 7.

The transaxle includes a transaxle case having a converter housing section "a", transmission case section "b" and side cover "c". The transmission case section "b" has a main power train receiving portion "d" for receiving therein a main power train of a transmission and a differential side cover portion "e" cooperating with a portion "a1" of the converter housing section "a" for receiving therein a final drive gear and a differential. A center axis of concentric input and out put gears constituting part of the main power train is indicated by "f" in FIG. 7. A center axis of a reduction gear or idler gear "j" in the form of a worm gear is indicated by "g". A center axis of the final drive gear or final drive shaft is indicated by "h". The output gear is meshed with the idler gear which is in turn meshed with the final drive gear. A governor is generally indicated by "i" and driven by a worm wheel "k" concentrically installed thereon and meshed with the worm gear "j".

The transmission case section "b" has a reinforcement "l" (refer to FIG. 6) between the main power train receiving portion "d" and differential side cover portion "e" for rigidly together.

As seen from FIG. 7, the governor "i" is arranged between the center axis "f" of the output shaft and the center axis "g" of the reduction gear in such a way as to axially extend along a line nearer to the horizontal than to the vertical. The governor "i" is received in a hollow governor receiving portion "m" of the transmission case section "b". The governor receiving portion "m" thus forms an opening "n" in a nearly vertical peripheral wall portion of the transmission case section "b". Such a governor receiving portion "m" reduces the structural strength of the transmission case section "b" and therefore requires additional reinforcements. This inevitably increases the weight of the automatic transaxle.

SUMMARY OF THE INVENTION

In accordance with the present invention, there is provided an improved transmission case section for an automatic transaxle case.

The transmisson case section comprises a main power train receiving portion, a differential side cover portion cooperating with the main power train receiving portion to form a corner therebetween and an integral reinforcement arranged in the corner to interconnect the main power train receiving portion and differential side cover portion. The main power train receiving portion has a main power train center axis and a reduction gear center axis parallel to each other. The transmission case section further comprises a governor receiving portion having a center axis between the main power train center axis and the reduction gear center axis when viewed in a plane perpendicular to the main power train center axis and reduction gear center axis. The governor receiving portion is formed so as to extend through the reinforcement.

The above structure is effective for overcoming the above noted disadvantage or shortcoming inherent in the prior art transaxle case.

It is accordingly an object of the present invention to provide an improved automatic transaxle case for a front engine-front drive vehicle which can increase the strength without substantially increasing the weight.

It is a further object of the present invention to provide an improved automatic transaxle case of the above described character which is structurally simple but has a great practical usefulness.

DESCRIPTION OF THE PREFERRED EMBODIMENT

Figure 6:
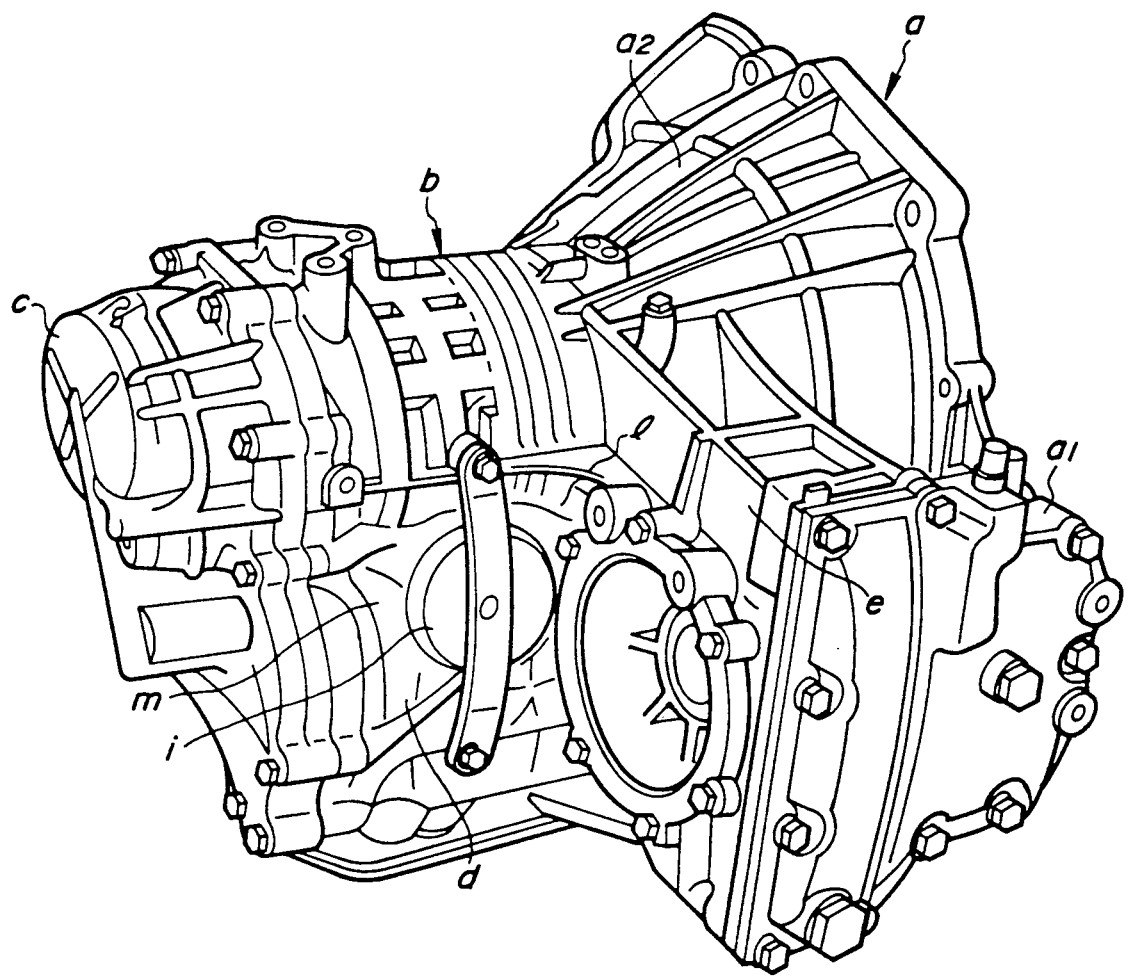
FIG. 6 is a perspective view of a prior art automatic transaxle.
Figure 7:
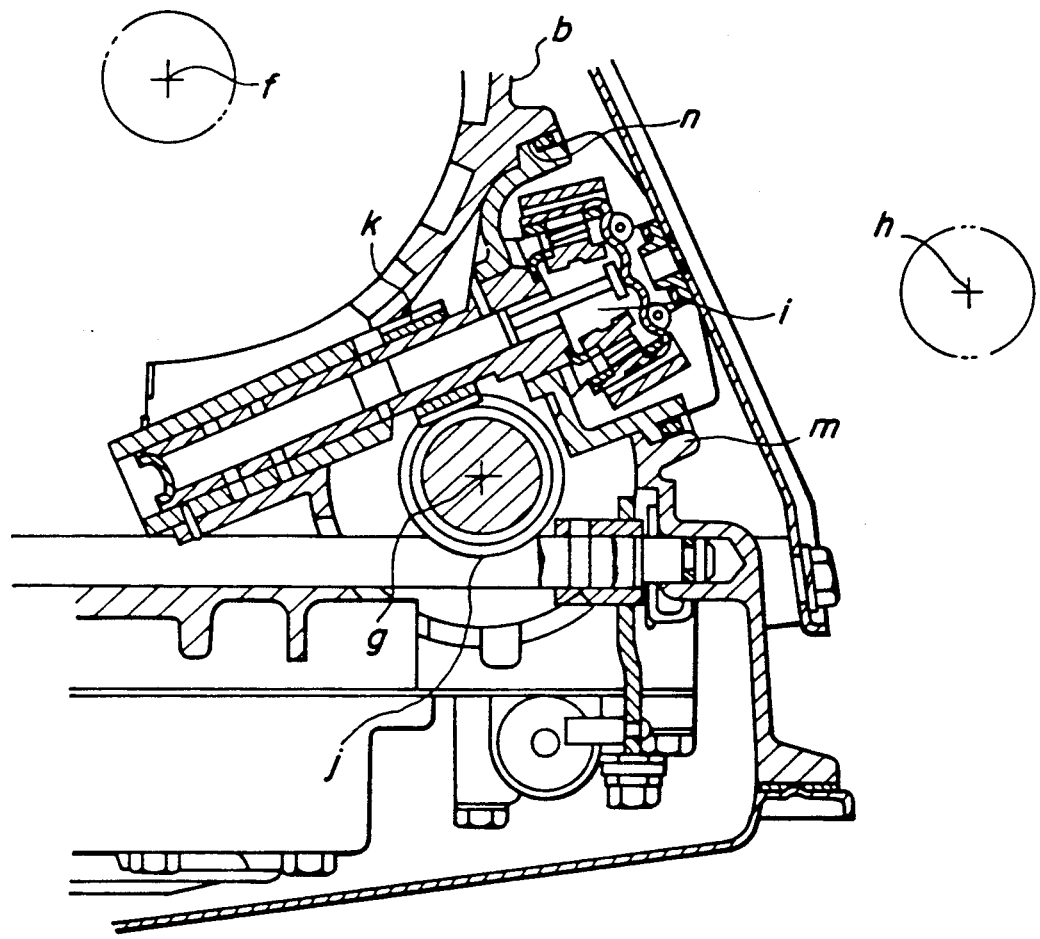
FIG. 7 is a fragmentary sectional view of the automatic transaxle of FIG. 6.

Referring to FIGS. 1-5, a transmission case section for an automatic transaxle case according to an embodiment of the present invention is generally indicated by 1 and includes a main power train receiving portion 1a in line with a portion of a torque converter case section (corresponding to "a2" in FIG. 6) for receiving therein a torque converter (not shown) and a differential side cover portion 1b cooperating with a portion of the torque converter case section (corresponding to a portion "a2" in FIG. 6) to define a differential receiving portion for receiving therein a final drive gear and differential (neither shown). The transmission case section 1 is configured so as to have a corner between the main power train receiving portion 1a and differential side cover portion 1b.

A center axis of input and output gears of the main power train is indicated by 2. A center axis of a final drive gear or final drive shaft is indicated by 3 and arranged so as to be parallel to the center axis 2 of the output gear. A center axis of a reduction gear or idler gear is indicated by 4 and arranged so as to be parallel to the center axis 2 of the output gear and the center axis 3 of the final drive gear. The output gear of the main power train is meshed with the reduction gear which is in turn meshed with the final drive gear so that a power is transmitted through the reduction gear and final drive gear to the differential.

Figure 1:
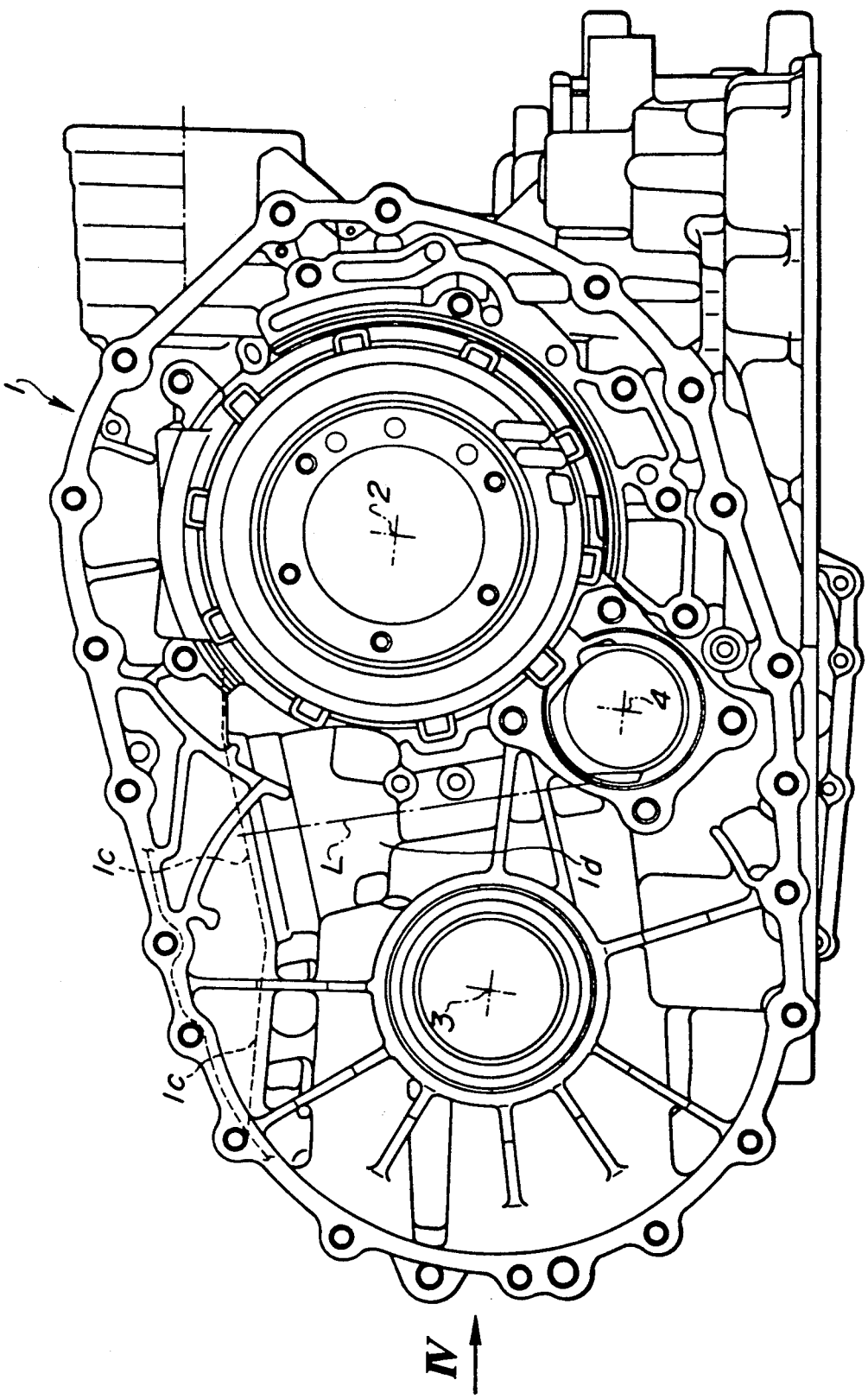
FIG. 1 is a front elevational view of a transmission case section of an automatic transaxle case according to an embodiment of the present invention.
Figure 2:
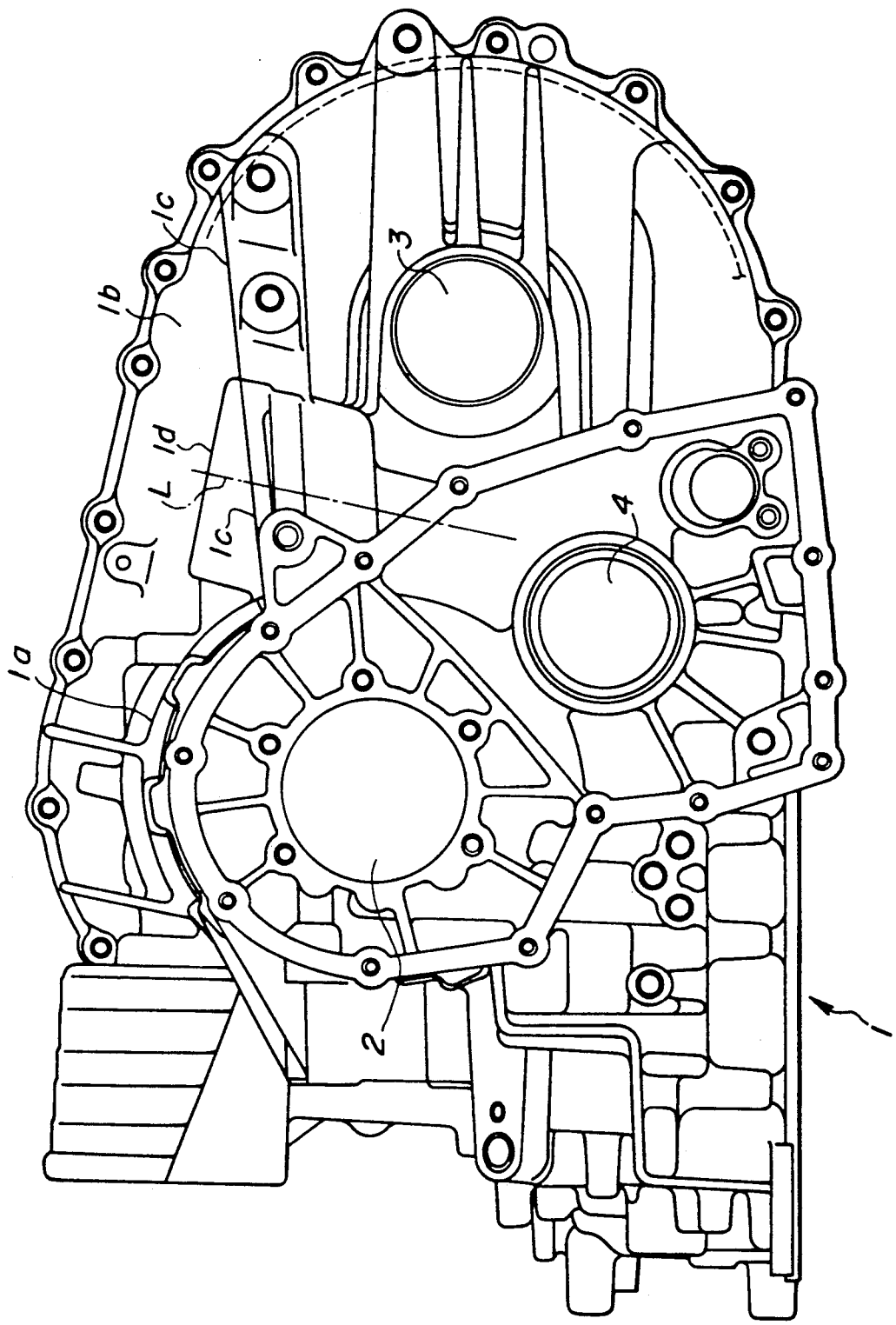
FIG. 2 is a rear elevational view of the transmission case section of FIG. 1.
Figure 3:
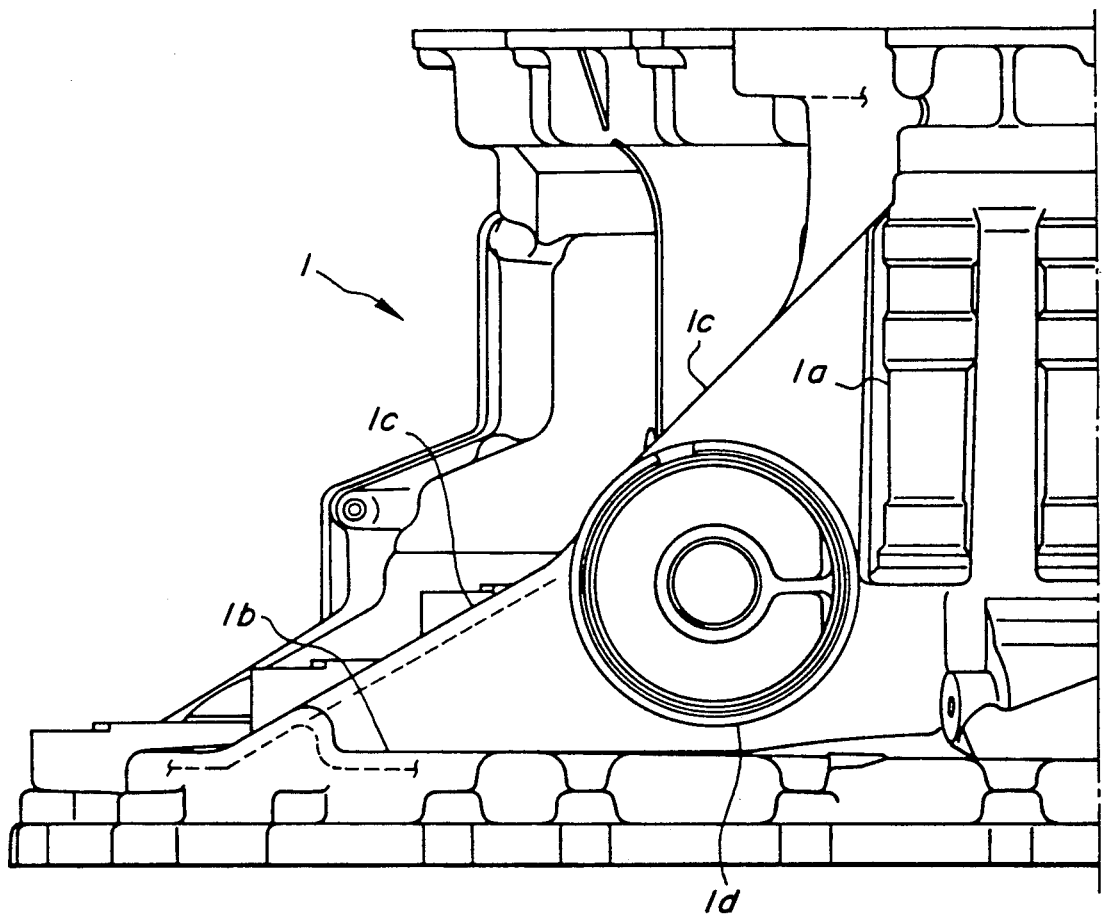
FIG. 3 is a view taken along the arrow III—III of FIG. 1.
Figure 4:
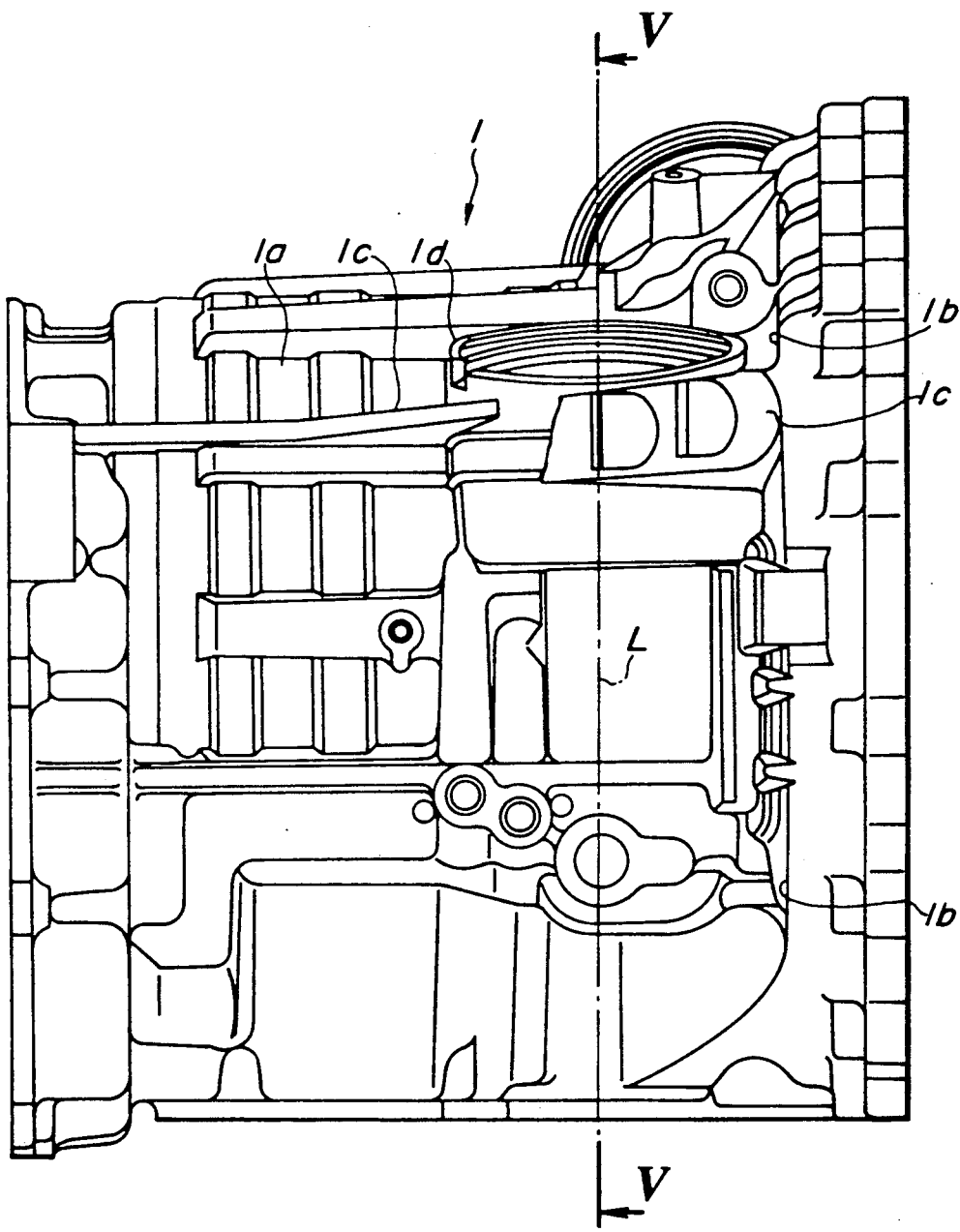
FIG. 4 is a side view taken along the line IV of FIG. 1.
Figure 5:
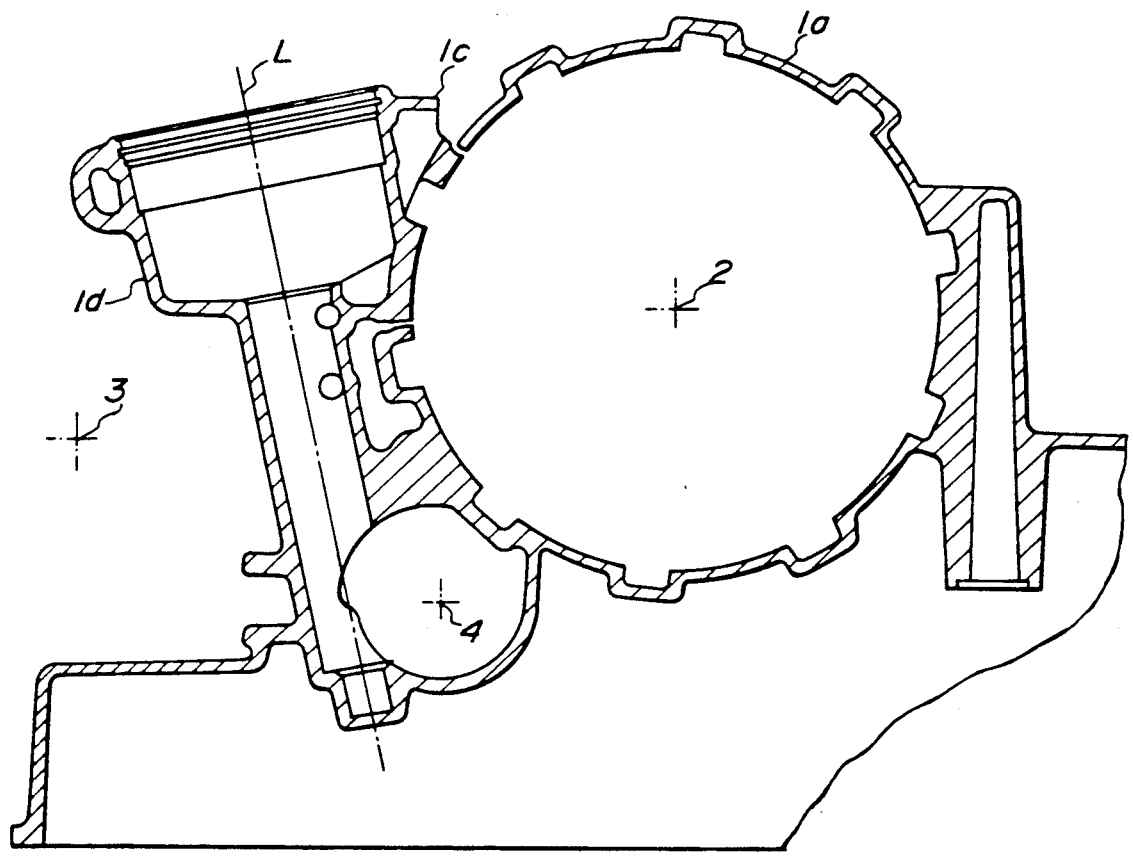
FIG. 5 is a sectional view taken along the line V—V of FIG. 4.

The transmission case section 1, as shown in FIG. 3, is formed with an integral reinforcement 1c in the corner between the main power train receiving portion 1a and differential side cover portion 1b. The reinforcement 1c has a nearly right-angled triangular shape when observed in a top plan view of the transmission case section 1 and rigidly interconnects the main power train receiving portion 1a and differential side cover portion 1b. A center axis of a governor or a hollow cylindrical or tubular governor receiving portion 1d is indicated by "L" in FIGS. 4 and 5. As seen from FIG. 5, the center axis "L" of the governor receiving portion 1d is arranged between the center axis 3 of the output gear (i.e., main power train center axis) and center axis 4 of the reduction gear and axially extends nearly vertically, i.e., axially extends along a line nearer to the vertical than to the horizontal. Further, the center axis "L" of the governor receiving portion 1d extend across or transversely of the center axis 3 of the output gear and the center axis 4 of the reduction gear. The governor receiving portion 1d is formed so as to axially extend through the above described reinforcement 1c. That is, the governor receiving portion 1d has an upper end portion constituted by the reinforcement 1c.

In the foregoing, it is to be noted that according to the present invention the center axis "L" of the governor or governer receiving portion 1d is arranged between the center axis 3 of the output gear and the center axis 4 of the reduction gear and in such a way as to axially extend nearly vertically, i.e., axially extends along a line nearer to the vertical than to the horizontal. By this, it becomes possible to form the upper end portion of the governor receiving portion 1d so as to extend through the reinforcement 1c which is arranged in the corner between the main power train receiving portion 1a and differential side cover portion 1b.

With the above structure, the reinforcement 1c and part of the governor receiving portion 1d can be in one i e. the reinforcement 1c can serve as the governor receiving portion 1d while on the other hand the governor receiving portion 1d can serve as the reinforcement 1c.

Accordingly, the present invention makes it possible to increase the strength of the transmission case section 1 without increasing the weight.

What is claimed is:

1. A transmission section for an automatic transaxle case comprising:
    a main power train receiving portion;
    a differential side cover portion cooperating with said main power train receiving portion to form a corner therebetween;
    an integral reinforcement arranged in said corner to interconnect said main power train receiving portion and said differential side cover portion;
    said main power train receiving portion having a main power train center axis and a reduction gear center axis parallel to each other; and
    a governor receiving portion having a center axis between said main power train center axis and said reduction gear center axis when viewed in a plane perpendicular to said main power train center axis and said reduction gear center axis;
    said governor receiving portion being formed so as to extend through said reinforcement.

2. The transmission case section to claim 1 wherein said center axis of said governor receiving portion extends transversely of said main power train center axis and said reduction gear center axis.

3. The transmission case section according to claim 1 wherein said reinforcement has a nearly right-angled triangular shape when observed in a plane view.

4. The transmission case section according to claim 1 wherein said center axis of said governor receiving portion axially extends along a line nearer to the vertical than to the horizontal.

5. The transmission case section according to claim 4 wherein said center axis of said governor receiving portion axially extends nearly vertically.

6. The transmission case section according to claim 1 wherein said differential side cover portion has a final drive gear center axis parallel to said main power train center axis and said reduction gear center axis.

7. A transmission case for an automatic transaxle for a front engine-front drive vehicle:
    a main power train receiving portion;
    a differential side cover portion cooperating with said main power train receiving portion to form a corner therebetween;
    an integral reinforcement arranged in said corner to interconnect said main power train receiving portion and said differential side cover portion;
    said main power train receiving portion having a main power train center axis and a reduction gear center axis parallel to each other; and
    a governor receiving portion having a center axis between said main power train center axis and said reduction gear center axis when viewed in a plane perpendicular to said main power train center axis and said reduction gear center axis;
    said governor receiving portion being formed so that its upper end portion is formed in said reinforcement.

* * * * *